United States Patent [19]

Toekes

[11] 4,107,410
[45] Aug. 15, 1978

[54] POLYMERIZATION COLUMN AND METHOD OF POLYMERIZING VINYLIDENE COMPOUNDS

[75] Inventor: Barna Toekes, Athol, Mass.

[73] Assignee: Polysar Resins, Inc., Leominster, Mass.

[21] Appl. No.: 790,031

[22] Filed: Apr. 22, 1977

[51] Int. Cl.² .................... C08F 2/02; C08F 2/04; C08F 2/12; C08F 12/06
[52] U.S. Cl. .................... 526/73; 23/283; 23/288 K; 526/88; 526/346; 526/918
[58] Field of Search .................... 526/73, 88; 23/283, 23/288 K

[56] References Cited

U.S. PATENT DOCUMENTS

| 2,148,545 | 2/1939 | Dorndorf et al. | 23/288 K |
| 2,727,884 | 12/1955 | McDonald et al. | 526/88 |
| 3,451,986 | 6/1969 | Metais | 526/88 |
| 3,480,404 | 11/1969 | Upson | 526/88 |
| 3,520,661 | 7/1970 | Grobe et al. | 526/88 |

Primary Examiner—Alan Holler
Attorney, Agent, or Firm—Stevens, Davis, Miller & Mosher

[57] ABSTRACT

A method of polymerizing and a polymerization column for a monomeric vinylidene compound in which heat exchange tubes are spaced relatively along a polymerization chamber, each tube lying in a radial plane of the chamber and having an ingoing length and an outgoing length, the two lengths being in the form of windings with the windings of each length lying between windings of the other.

12 Claims, 12 Drawing Figures

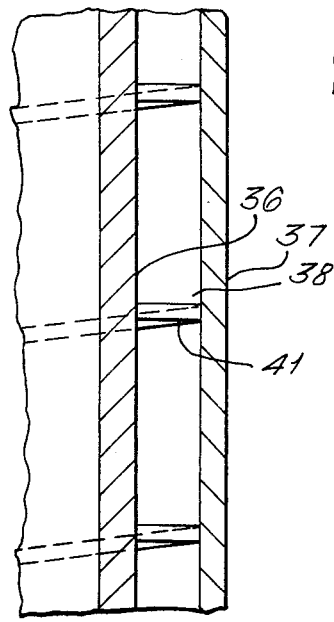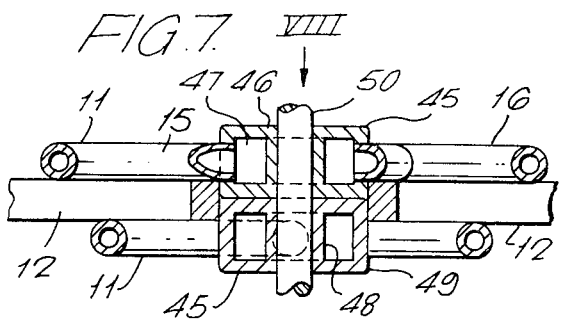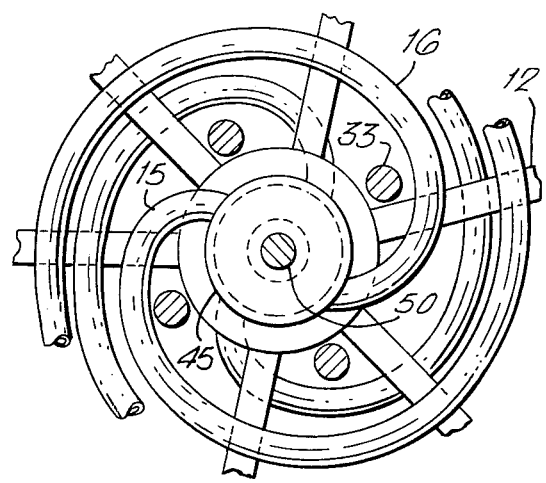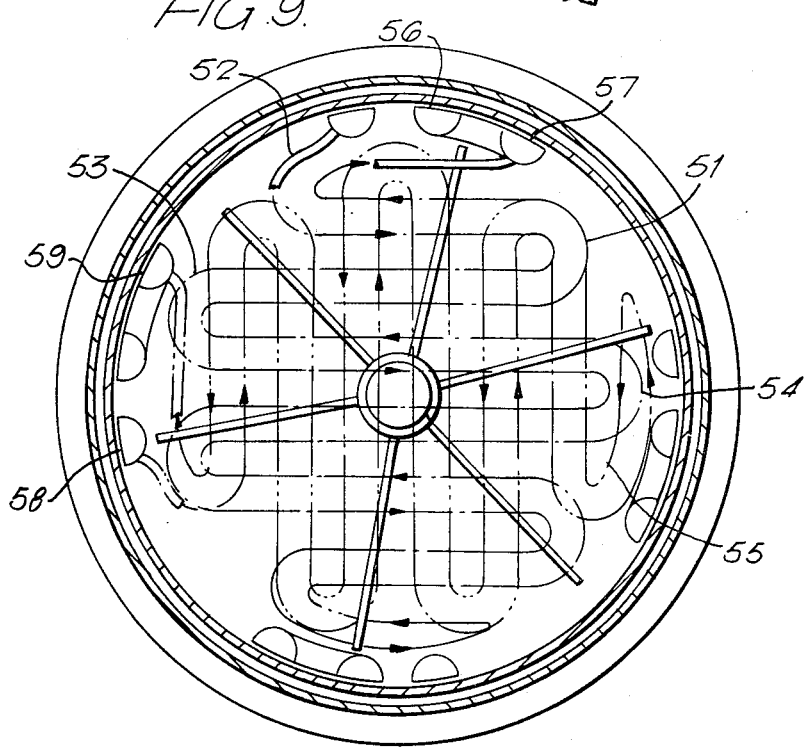

POLYMERIZATION COLUMN AND METHOD OF POLYMERIZING VINYLIDENE COMPOUNDS

This invention relates to a method and apparatus for the continuous polymerization of a monomeric vinylidene compound in bulk, or with the aid of an inert medium, to form a fluid mass which becomes more viscous as the polymerization proceeds.

The method and apparatus may be applied to the polymerization of monomeric vinylidene compounds such as vinyl chloride, ethyl acrylate, vinyl acetate, acrylic nitriles, and especially vinyl aromatic compounds.

In the case of acrylonitrile and vinyl chloride, the art includes polymerization processes employing water as the inert medium where desired; in the case of polymerization of a styrene, it is known optionally to employ as an inert medium an inert organic solvent of boiling point 130° to 200° C e.g., ethylbenzene, ethyl toluene or isopropylbenzene, in an amount of up to about 20% of the polymerization mass.

The invention is particularly concerned with the continuous polymerization of monovinyl aromatic compounds, for example, styrene, alpha-methyl styrene, ortho- or paramonochlorostyrenes, isopropyl styrene, tertiary-butyl styrene and other substituted styrene monomers, vinyl toluene, or mixtures thereof. Also mixtures thereof containing greater than 50% by weight monovinyl aromatic compound with less than 50% by weight of another monoethylenically-unsaturated comonomer, e.g. a $C_1$-$C_3$ alkyl arcylate, acrylic nitrile and vinyl propionate may be used. The polymerization mass may also include a rubbery impact modifier in amounts such as is known in the art, for example, a rubbery polymer of butadiene, ethylene-propylene rubber, or chlorosulfonated polyethylene, of which a stereoregular form having high cis-4 content of the former has been shown to be well suited as a modifier in the case of forming polystyrene.

Bulk or mass polymerization of vinyl aromatic compounds is performed most conveniently in a two stage process. For instance, in a first stage of polymerizing styrene, the styrene is partially polymerized in a vessel while being stirred within a controlled temperature range of from 60° C to 110° C and possibly higher. During polymerization, the viscosity of the solution of polymer in monomer increases as the solids level increases until the material cannot be easily stirred. To complete polymerization according to the second stage in the process, it is then necessary to transfer the partially polymerized material to a vertical polymerization column through which the material moves. The material is fed into the top and descends the column. During its descent, polymerization of the material is completed.

It is known that the chain lengths and strength properties of the resultant polymer are related to temperature of polymerization. While polymerization proceeds at a faster rate with higher temperature, in contrast both the chain lengths and strength properties are less than would be obtainable at lower polymerization temperatures. It is important, therefore, to be able to control the polymerization temperature uniformly across the column in order to obtain polymer with chain lengths and strength properties which satisfy predetermined requirements while effecting polymerization within a satisfactory time. Difficulties in temperature control are increased by the exothermic reaction governing the polymerization process. Attempts have been made precisely to control the temperature of the material during polymerization so that complete homogeneity of the polymer horizontally across the column is achieved. However, the object of complete homogeneity has so far not been achieved. It has been known to control the temperature of the material in successive zones along the polymerization column. Typically, heat is removed from the material in a zone or zones at the upper end of the column by use of a heat exchange means within the column whereby the material temperature is held down to promote continuing polymerization at a fixed rate. In contrast, in a zone or zones at the lower end of the column, the temperature is increased. Higher temperatures are needed in the lower zones to keep up the necessary polymerization rate and maintain the polymer chain lengths. Higher temperatures also assist in the flow of the polymerizing material by decreasing its viscosity, as the viscosity otherwise tends to increase as polymerization proceeds.

However, it has been found to be impossible to control the temperature of the polymerizing material so as to achieve complete homogeneity. For instance, if at any axial cross-section of the column the temperature is not uniform, then at this position lack of uniformity exists in the rate of polymerization. In consequence, in the final polymer the molecular weight distribution varies from region to region across its thickness. Such variation may be very considerable and the product has unfavourable and widely differing mechanical qualities. Undesirable molecular weight distribution is also increased by accumulation of monomeric styrene in the column thus resulting in overheating of the styrene to provide an increased proportion of regions of low molecular weight in the final polymer.

In an attempt to overcome the above problem, polymerization columns have been constructed in the manner described in U.S. Pat. No. 3,451,986 with heat exchange tubes formed into series of rings throughout the columns. Although such columns have provided an improved degree of temperature control over previous constructions which has made molecular dispersion more uniform, there has been an unavoidable temperature gradient between the inner and outer regions of each ring which has been largely responsible for non-attainment of complete homogeneity.

The present invention provides a method of polymerization and a polymerization column in which there is a greater degree of temperature control whereby a polymerized monomeric vinylidene compound may be obtained which has a homogeneity which is more complete than in previous monomeric vinylidene compounds polymerized by the use of a polymerization column.

According to the present invention, a polymerization column for polymerizing a monomeric vinylidene compound has a polymerization chamber housing a heat exchange means comprising a series of heat exchange tubes, the tubes being spaced relative to one another vertically of the chamber and each tube having a tube inlet and a tube outlet, a fluid ingoing tube length extending across the chamber in one directional sense from the tube inlet, and a fluid return tube length which extends across the chamber in the opposite directional sense from the ingoing tube length to the tube outlet, and both tube lengths being in the form of windings to provide laterally spaced portions of each tube length, with portions of one tube length being disposed laterally between spaced portions of the other tube length when considered in a radial plane of the chamber, and means to control the temperature of each tube.

In a preferred arrangement, portions of one tube length lie between portions of the other tube length with the median axes of the two tube lengths lying in a single radial plane.

In the above construction according to the invention, although there is an unavoidable temperature gradient in each tube, there is a better control of rate of polymerization at each radial level down the chamber of the column and thus a better molecular dispersion in the resultant product. The reason for this is as follows. The tube portions of the return tube length have temperatures at one end of the temperature gradient of the tube whereas those of the ingoing tube length have temperatures at the other. The arrangement of the tube length portions is necessarily such that the colder portions of the cooler length lie between the warmer portions of the warmer length and the succeeding portions of the cooler length which increase in temperature from portion to portion lie betweeen correspondingly decreasing temperature portions of the warmer length. The practical significance of this is that there is a temperature compensation effect created by the influence of each tube length portion upon those it lies between whereby substantially uniform temperature is established in the compound at the radial plane of the tube.

Ordinarily, it is preferred that each tube length is in the form of a planar spiral. The ingoing tube length extends as a spiral radially inwards of the chamber from the inlet and the fluid return tube length extends radially outwards from the ingoing tube length. The convolutions of the spiral of one length alternate with those of the other in a direction diametrically across the chambr. Alternatively, the ingoing and return tube lengths are in the form of a plurality of planar sinuations extending across the chamber with the sinuations of one length lying between those of the other.

To assist in heat distribution and to enable better temperature control, it is preferable to have adjacent tubes angularly displaced around the axis of the column.

The invention also includes a method of polymerizing a monomeric vinylidene compound comprising feeding partially polymerized compound downwardly of a chamber of a polymerization column at a controlled rate of feed and, during the feeding, controlling the temperature of the compound at any given axial position and its temperature gradient as it descends the column by passing the compound over heat exchange tubes which lie in planes across the chamber, the tubes being disposed in series along the axis of the column and each tube having a fluid ingoing tube length and a fluid outgoing tube length, the lengths extending in directions of opposite sense across the chamber and both tube lengths being in the form of windings to provide laterally spaced portions of each tube length with spaced portions of one tube length being disposed between spaced portions of the other tube length, the temperature of the compound being controlled as it passes each tube by heat exchange between the compound and the two tube lengths, the temperature of each tube progressively changing along the tube lengths so that the temperature of each tube length portion is different from the tube length portions which it lies between to provide a temperature compensation effect and maintain a substantially constant temperature level radially across the compound at the tube level, and the temperature of the tubes being controlled within limits and with respect to one another so as to control the temperature gradient and rate of polymerization of the compound as it passes down the chamber.

Embodiments of the invention will now be described by way of example. All of the embodiments relate to polymerization columns for the polymerization of styrene. The embodiments are described with reference to the accompanying drawings in which:

FIG. 6 is a cross-sectional view, in an enlarged scale, of part of a casing of the column;

FIG. 7 is a side elevational view of part of a heat exchange means of a column forming a second embodiment;

FIG. 8 is a view in the direction of arrow VIII in FIG. 7;

FIG. 9 is a view similar to FIG. 4 of a third embodiment;

Figure 1:
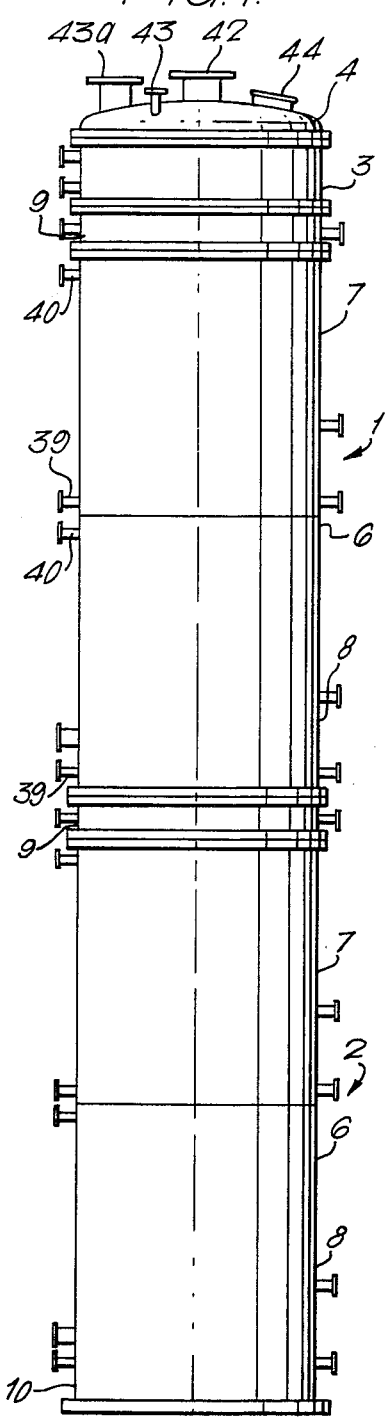
FIG. 1 is a side elevational view of a polymerization column forming one embodiment.

In a first embodiment of the invention, a polymerization column comprises axially aligned upper and lower sections generally indicated 1 and 2 in FIG. 1, the upper section being surmounted by a cylindrical head section 3 and dome end 4.

Each section 1 and 2 comprises a casing 6 which consists of cylindrical casing halves 7 and 8 and a support casing portion 9 for heat exchange means (to be described) which is housed within the casing. As may be seen from FIG. 1, the upper section 1 is disposed with its casing portion 9 directly beneath the head section 3 and the lower section 2 is disposed with its casing portion 9 located between the upper section and casing half 7 of the lower section. The casing halves, casing portions, head section and dome end are provided with annular mating flanges at abutting ends, the flanges being bolted together by bolts (not shown) in fluid tight engagement.

Figure 2:
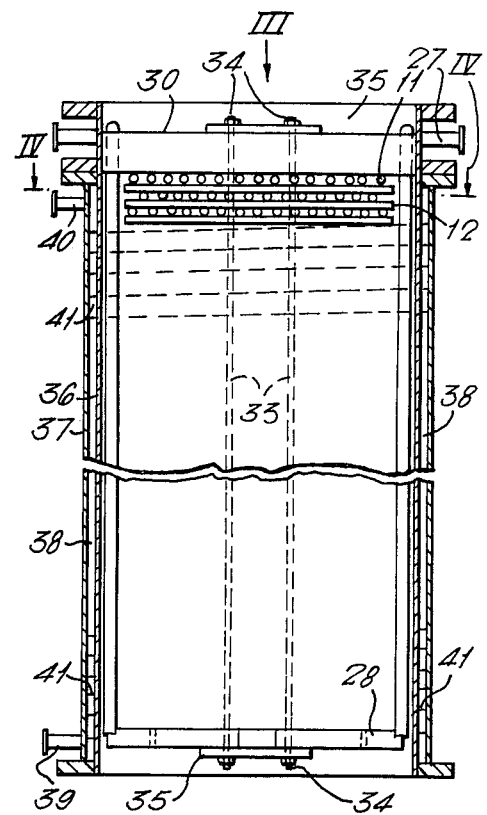
FIG. 2 is a vertical cross-sectional view of one part of the column.
Figure 4:
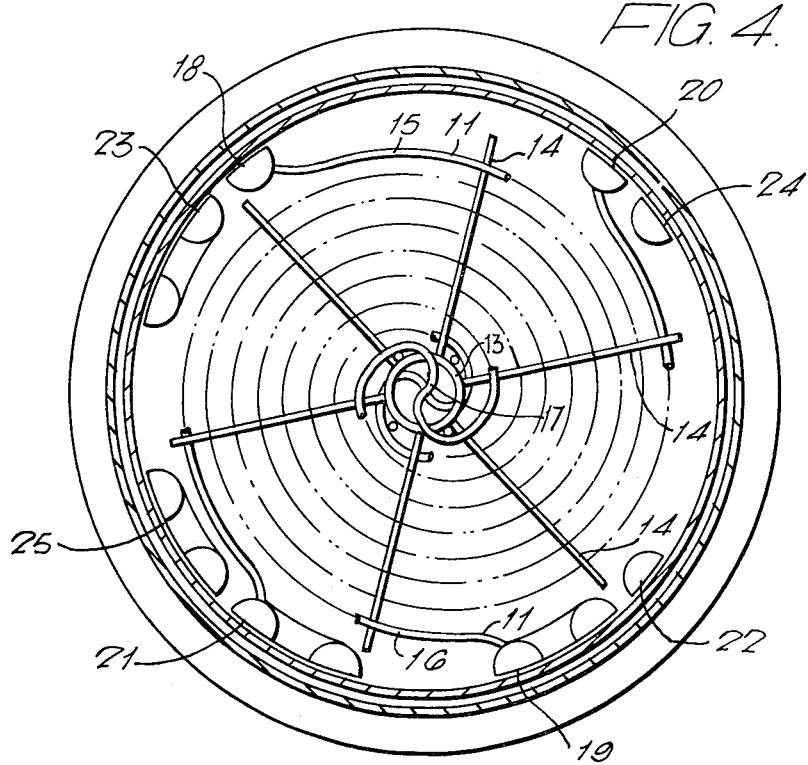
FIG. 4 is a cross-sectional view of the column taken along line IV—IV in FIG. 2.

The two sections 1 and 2 are of substantially the same design. For convenience, therefore, the section 1 only will be described. As shown in FIG. 2, the heat exchange means which is housed within section 1, comprises a series of heat exchange tubes 11 which are disposed in stacked formation one above the other and alternate with spacing members 12 stacked between them. As can be seen from FIG. 4, each of the support members comprises a central ring 13 carrying radially extending arms 14 which lie between the tubes. As may be seen more particularly from FIG. 4, each tube is in the form of windings and extends substantially completely across the chamber of the column. Each tube has a fluid ingoing tube length 15 which is in the form of a flat spiral having convolutions lying one within the other and extending towards the center or axis of the chamber. Each tube also has a fluid return tube length consisting of convolutions 16 of a planar spiral. The two tube lengths are interconnected at the center of the column by a reverse turn 17 in the tube itself. From FIGS. 2 and 4, it can be seen that in each tube the convolutions 16 lie between the convolutions 15 so that in a direction diametrically across the chamber the convolutions 16 alternate with the convolutions 15. As the spirals are planar, it follows that the median axes of the spirals lie in a single plane. In section 1, there are 70 heat exchange tubes 11, 35 being housed within each of the casing halves 7 and 8. Alternate tubes in casing half 7 are fed from a header tube 18 and in turn feed into an outlet header tube 19 as shown in FIG. 4. The remainder of the tubes in casing half 7 are fed from an inlet header tube 20 and feed into an outlet header tube 21. Likewise, for the tubes within casing half 8, alternate ones are fed from an inlet header tube 22 and feed into outlet header tube 23 whereas the remainder have inlet header tube 24 and outlet header tube 25. The reason for this is that it enables all of the tubes to be made with substantially the same spiral configuration while ensuring that the convolutions of adjacent tubes do not lie directly above one another. FIG. 4 shows that adjacent spirals do in fact lie in staggered relationship to one another in plan view. This configuration is easily obtained by merely having adjacent tubes angularly displaced relative to one another by approximately 90° and fitting them to the separate header tubes as described above. The configuration shown in the embodiment of the staggered relationship of adjacent tubes operates to minimize channeling of material during polymerization along the column and ensures that there is greater heat exchange between the material and the heat exchange tubes. Thus, any material which tends to channel between convolutions 15 and 16 of one tube immediately is separated by a spiral of the next following tube.

Figure 5:
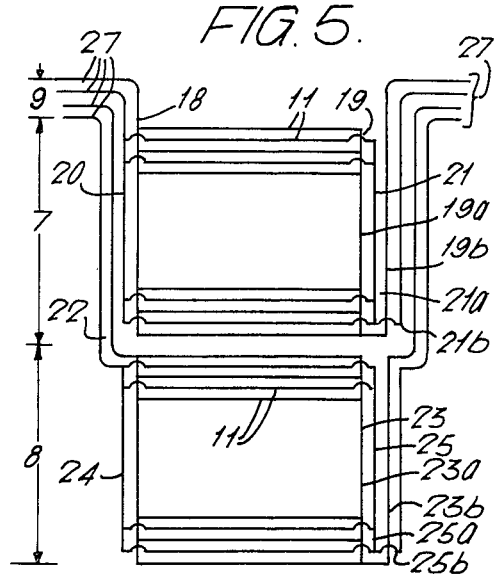
FIG. 5 is a diagrammatic view showing the flow path for fluid in a heat exchange means of the column.

The header tubes extend vertically downwards through the column and are connected to inlet and outlet manifolds 26 and tubes 27 which extend through the casing portion 9. For the sake of clarity, FIG. 2 does not show in any detail the arrangement of the header tubes, manifolds and tubes 27, as this figure is concerned with the disposition of the tubes and spacing members. However, as can be seen from the diagrammatic representation in FIG. 5 which illustrates the flow path for fluid taken through the heat exchange means, the inlet header tubes 18 and 20 extend only to the lower end of casing half 7, whereas the other two inlet header tubes 22 and 24 extend through casing half 7 and into casing half 8 to supply fluid to the tubes 11 in that casing half. Similarly, outlet header tubes 19 and 21 lie solely in casing half 7, whereas outlet header tubes 23 and 25 extend downwardly into casing half 8 for the return of fluid from the tubes 11 in that half. To ensure that the fluid passing through each tube 11 passes along a flow path of substantially the same length as fluid passing through other tubes 11 so that there is no tendency for fluid to pass more slowly through some tubes than others, the return header tubes are of special configuration. The header tubes 19, 21, 23 and 25 have respectively header portions 19a, 21a, 23a and 25a, which are interconnected directly with the heat exchange tubes 11 and extend downwardly to the lower end of the respective casing halves at which point there is a return bend interconnected to upwardly extending portions 19b, 21b, 23b and 25b, which pass the fluid into the outlet manifolds and outlet tubes. This is clear from the diagrammatic representation of FIG. 5.

As can be seen from FIG. 4 particularly, the header tubes are not of circular configuration. In contrast, each header tube has a major and a minor axis, the major axis extending substantially normal to a radius of the chamber of the column and the minor axis extending along the radius so as effectively to minimize the distance between the casing and the outermost spirals of the tubes. In practice, the configuration and positioning of the header tubes is such that at positions shortly before they enter the inlet and outlet header tubes, the outermost convolutions of the tube lengths lie at a distance from the casing which is substantially no greater than the distance between the convolutions themselves, i.e. between the convolutions 15 and 16. In the embodiment, each header tube in cross-section has a portion of semi-circular configuration extending inwardly from the chamber and a slightly curved portion which joins the two ends of the semi-circular portion.

For convenience and ease of maintenance, the whole of the heat exchange means together with the spacing arms is assembled onto the casing portion 9 so that should replacement or repair by necessary it is merely required to remove the casing from the top of casing half 7 which immediately withdraws the heat exchange means for inspection. The manner in which the heat exchange means is assembled to casing portion 9 is as follows.

Figure 3:
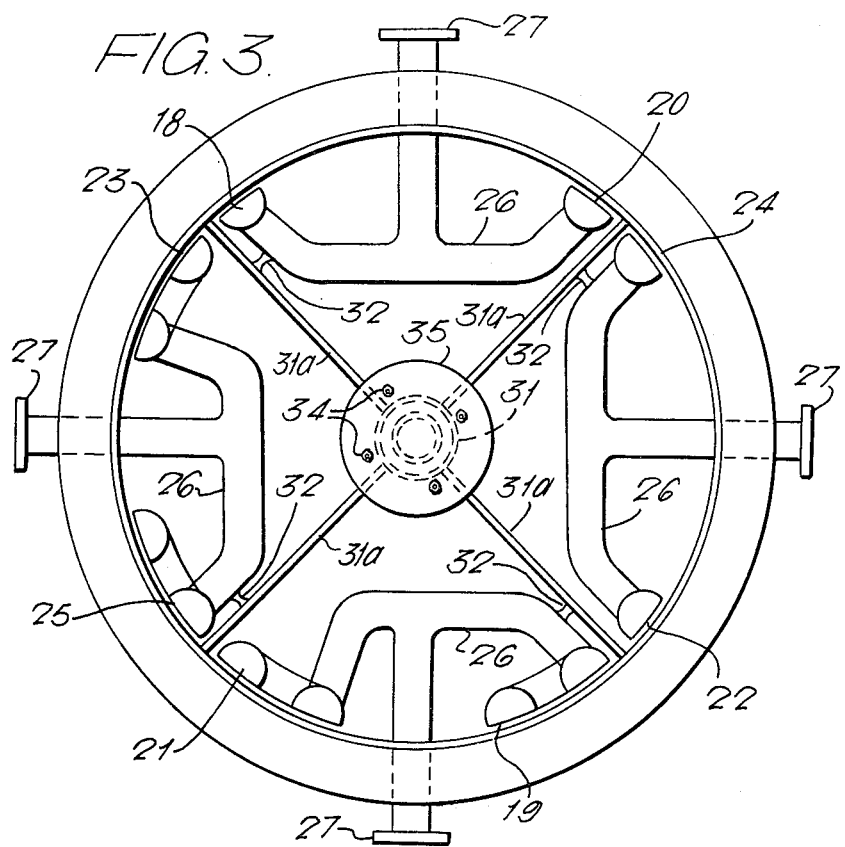
FIG. 3 is a plan view in the direction of arrow III in FIG. 2.

As shown in FIG. 2, at the lower end of casing half 8, there is provided a stack support member 28 which is of radial arm configuration similar to that of the spacing members 12. The casing portion 9 is provided with a main support in the form of a spider 30 which extends across the casing portion and has a central tubular strengthening section 31. As shown in FIG. 3, there are four arms 31a provided for the main support and these arms are welded to the inside surface of the casing portion 9. Also secured to the arms at positions 32 in FIG. 3 as by welding or brazing are the inlet and outlet manifolds 26. The stack of heat exchange tubes 11 and spacing members 12 is carried by the stack support member 28 which in turn is carried by the main support or spider 30 by a suspension means in the form of four screw threaded rods 33 extending downwardly through the stack. As is clearly shown by FIG. 4, the relative positioning of the tubes and support members around the center of the chamber is such that spaces are formed through which the rods pass vertically. These rods extend between the arms of spacing members 12 and also between the arms of the main support and of the stack support member. The rods are screw-threaded at their two ends and are secured in position by nuts 34 which are received on the outside of abutment plates 35, one of which is carried above the main support and lies across the arms 31a and the other of which lies beneath the stack support member 28 and also extends across the arms. It can be seen, therefore, that when the casing portion 9 is removed from the column, the rods 33 take the full weight of the heat exchange assembly onto the main support 31 and the complete assembly of heat exchange means and casing portion 9 is removed.

Each casing half 7 and 8 provides its own heat exchange jacket. FIG. 6 illustrates a side elevational cross-sectional view of a portion of casing section 1 which shows that each casing half comprises inner and outer cylindrical walls 36 and 37 which define between them an annular chamber 38. Each heat transfer jacket is provided with heat exchange fluid through an inlet 39 (FIGS. 1 and 2) passing through the outer wall 38 and the fluid is removed by an outlet 40 disposed above the inlet 39. The water jacket is provided with a fluid flow path which is basically of spiral configuration which is formed by a spiral baffle 41 which is welded to the outer surface of the inner wall 36 so as to direct heat exchange fluid upwards in a spiral pattern from the inlet 39 to the outlet 40. This spiral arrangement ensures that there are no areas in which the jacket heat exchange fluid is either stationary or is moving at a slower rate than elsewhere so that no areas of substantially different temperature exist on the inner surface of the inner wall which could affect the state of the material during polymerization and affect its homogeneity.

The cylindrical head section 3 is also provided with a heat exchange jacket in a manner similar to the casing halves 7 and 8 although this water jacket is not shown in any detail. This water jacket is also provided with a spiral path formed by a baffle arrangement in a similar manner to the casing halves 7 and 8.

The temperature of the heat exchange tubes within the column is controlled by a temperature responsive and control means which is not shown in the drawings. Such an arrangement is well known in the art and need not be discussed more fully except to indicate that the temperature of the heat exchange tubes is controlled in banks of tubes lying within each of the casing halves 7 and 8 so that within the column as a whole there are four banks of tubes which are controlled independently. Temperature measurements are taken for each bank of tubes in conventional manner by a temperature sensing means (not shown) which is carried by support arms of some of the support members and the temperature responsive means operate to open or close valves (not shown) which increase or decrease the flow of coolant or heating fluid passing into the inlets 27 and thus to the headers and coils.

The dome end is provided with a main inlet 42 for partially polymerized material, a pressure relief device 43 incorporating a rupture disc of known form, an oxygen inlet 43a and a vapour outlet (not shown). A glass covered viewing aperture 44 is also provided through which the contents at the top of the column may be visually examined.

In use of the column to complete a polymerization process upon styrene which has been partially polymerized by a first stage process, the partially polymerized styrene is fed into the top of the column through aperture 42 by means of a feed tube and in continuous fashion so that continuous polymerization of styrene takes place within the column. The partially polymerized styrene is fed downwardly through the cylindrical head section 3 and then through the casing portion 9 and between the arms of the main support. It then continues by passing the tubes of the heat exchange means and also by passing between the arms of the support members. In a top portion of the column, it is necessary for the temperature of the partially polymerized styrene to be maintained between controlled limits so as to control the rate of polymerization. Therefore, the fluid passing through the tubes is at a lower temperature than the compound itself. As heat exchange takes place and the fluid passes along the spirals 15 on each tube ingoing length, the temperature of the fluid increases and continues to increase as it extends through the reverse portion of the tube 17 and along the convolutions 16 into its outlet header. However, although the temperature of the fluid increases in this fashion, it is found that the temperature radially across the column at any axial position is in a substantially balanced condition. This is because the convolutions 16 alternate with the convolutions 15 and are at a higher temperature than covolutions 15. The warmer of the convolutions 16 lie adjacent and between the cooler of the convolutions 15 i.e. towards the casings of the column, whereas the cooler convolutions 16 which lie more centrally of the chamber lie between the warmer convolutions 15. Because of this arrangement, a heat balancing effect across the chamber is obtained. Hence, polymerization at any axial position of the chamber proceeds at a substantially constant rate in any radial position and at any axial position, polymerization is at substantially the same stage right across the compound.

As the compound moves along the column towards the bottom, it becomes necessary gradually to heat the material to control the rate of polymerization and prevent hardening of the material as it polymerizes thus making it sufficiently viscous to enable it to travel along the column and out through the outlet. In this case, the tubes in the lower section of the column contain a heat exchange fluid at a higher temperature than the compound so that as heat exchange takes place, the temperature of the fluid passing inwardly of the chamber through convolutions 15 decreases, and a further decrease is effected in the fluid as it moves outwardly through the convolutions 16. The tubes in the lower section of the column also provide a balancing effect as they have spiral convolutions which alternate with each other.

It is found that polymerized material issuing from the column described above has a greater homogeneity than material which has been polymerized in any column previously devised. This is, of course, mainly because of the arrangement of the spiral tubes and in particular with regard to the relationship of the ingoing and return tube lengths. Such an arrangement must necessarily promote continuing polymerization at a fixed rate and does not allow for areas of the compound in which there are differing rates of polymerization. It is found, therefore, that the molecular weight distribution does not vary across the polymerized compound to the marked degree found in previous compounds which have been polymerized in a mass or bulk process using a column. It follows from this that the mechanical qualities and characteristics of the compound polymerized by the column described above do not vary to any significant extent. Apart from this, of course, there is no accumulation of monomeric styrene to be found in the column which could result in overheating of the styrene to provide regions of low molecular weight in the final polymer which has been found previously. The above desirable results are also assisted by the fact that the heat exchange tubes extend to as close as possible to the casing of the column and this particular arrangement is made possible by the configuration of the header tubes. In addition, of course, the heat exchange jacket of the casing itself assists in controlling the temperature at the radially outer regions of the compound thereby ensuring that complete control on the rate of polymerization right across the compound is achieved. Further, any tendency for the compound to move down the column in axial channels is eliminated by the angular displacement of adjacent tubes so that convolutions of each tube lie beneath spaces between convolutions of the tube above.

In a second embodiment (FIGS. 7 and 8) which is otherwise similar to the first embodiment, each heat exchange tube has spiral configurations 15 and 16 which are not joined by return bends 17. In contrast, the convolutions 15 and 16 of each tube are interconnected by a central box 45 which is of annular configuration and is disposed coaxially with the column. Each box has top and bottom end plates 46 which close an annular chamber 47 formed between inner and outer cylindrical members 48 and 49. The convolutions 15 and 16 of the tube communicate through the cylindrical part 49 of the box. As shown in FIG. 7, the boxes are stacked together to form the tubes into a stack formation and have a central rod 50 extending through them. This rod is provided with nuts (not shown) at each end which hold it to the support member and the main support in a manner similar to that described with regard to the first embodiment (i.e. by having nuts disposed either end of two abutment plates).

In a third embodiment of the invention shown in FIG. 9, a polymerization column is similar to that described in the first embodiment except for the shape of each heat exchanger tube 51. In the construction of the third embodiment, each heat exchanger tube has a fluid ingoing tube length 52 composed of a series of planar sinuations 53 which extend across the chamber from one side to the other. Each tube is also provided with a return tube length 54 composed of planar sinuations 55. The sinuations 55 extend across the chamber and the sinuations of each length lie between those of the other length. In this construction, inlet and outlet header tubes 56 and 57 are disposed side by side at one side of the column for each heat exchange tube. In this construction as in the first embodiment, alternate heat exchange tubes in each casing half are supplied with fluid from the same inlet header tube and expel fluid into the same outlet header tube. The other heat exchange tubes in each casing half are supplied with fluid from a header tube 58 and expel the fluid into an outlet header tube 59, the header tubes 58 and 59 being displaced by approximately 90° around the chamber of the column. As can be seen from FIG. 9, because of this angular difference in position from one tube to the next, then the sinuations of adjacent tubes cross each other at 90°, thus reducing any tendency for polymerizing material to form itself into axial channels during movement down the column.

In use of the column shown by FIG. 9, a heat balance is created as in the first embodiment across each tube so that the rate of polymerization is controlled and is at the same stage at each axial position right across the full width of the chamber.

Figure 10:
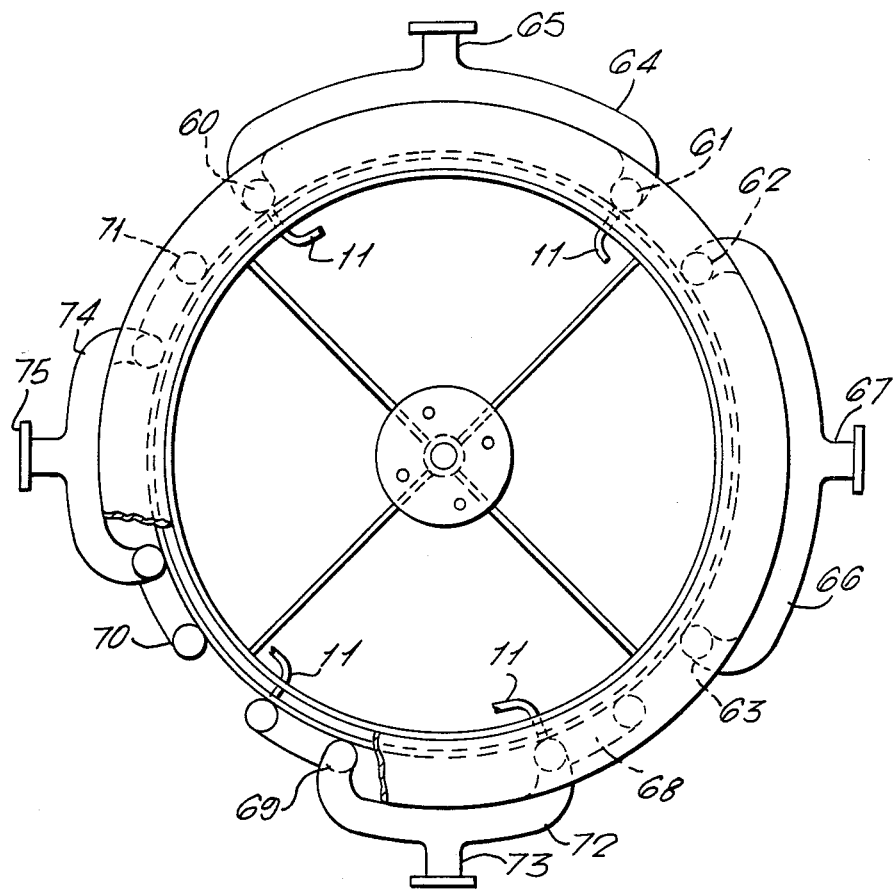
FIG. 10 is a view similar to FIG. 3 of a column according to a fourth embodiment, a casing top flange being omitted for clarity.

In a fourth embodiment as shown in FIG. 10, a polymerization column is similar to that described in the first embodiment except that it has its heat exchange tubes located outside the casing 6 of each of its casing halves.

In this embodiment in which parts similar to those described in the first embodiment bear the same reference numerals, casing half 7 has alternative tubes 11 fed from the header tube 60 extending vertically down the outside of the casing 6 and the remainder of the tubes 11 in casing half 7 are fed from an inlet header tube 61 similarly disposed to the header tube 60. Likewise for the tubes within casing half 8, alternative ones are fed from an inlet header tube 62 whereas the remainder are fed from inlet header tubes 63. FIG. 10 shows the inlet ends of heat exchange tubes 11 extending through the casing from the header tubes 60 and 61 but the inlets to the heat exchange tubes in the casing half 8 have been omitted for clarity. The header tubes 60 and 61 are fed by a common inlet manifold 64 from an inlet 65 whereas the inlet header tubes 62 and 63 have a common manifold 66 and inlet 67. Alternate heat exchange tubes in casing half 7 feed into an outlet header tube 68 whereas the remainder of the tubes 11 feed into outlet header tube 69. Similarly, the inlet header tubes 11 in casing half 8 feed alternately into outlet header tube 70 or 71. The outlet header tubes 68 and 69 feed into a common manifold 72 and outlet 73 and the outlet header tubes 70 and 71 feed into a common manifold 74 and outlet 75.

As can be seen from the disposition of the inlet and outlet header tubes in FIG. 10, the adjacent heat exchange tubes 11 lie in staggered relationship to one another in plan view as in the first embodiment and for the reasons explained above. In addition, the outlet header tubes are of U-shaped configuration for the reasons explained for the U-shaped header tubes described in the first embodiment.

With the construction of the fourth embodiment, while it is appreciated that each casing half is of more complex construction than in the first embodiment in that each of the heat exchange tubes must pass individually through the casing, the fourth embodiment has the advantage that it enables the heat exchange tubes to be located as close as possible to the inner surface of the casing 6 because no header tubes lie within the casing which can possibly restrict the location of the outer spiral of each heat exchange tube.

Figure 12:
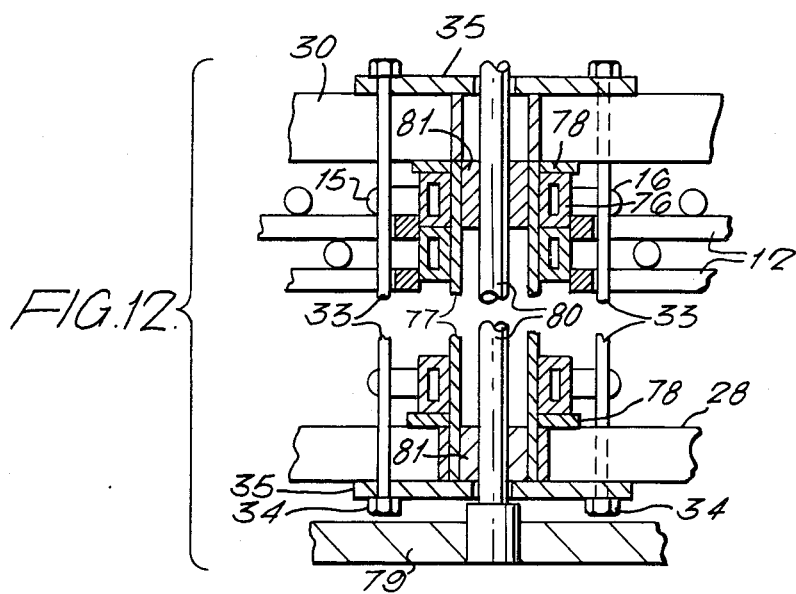
FIG. 12 is a vertical cross-sectional view of part of the column of FIG. 10 on a larger scale.
Figure 11:
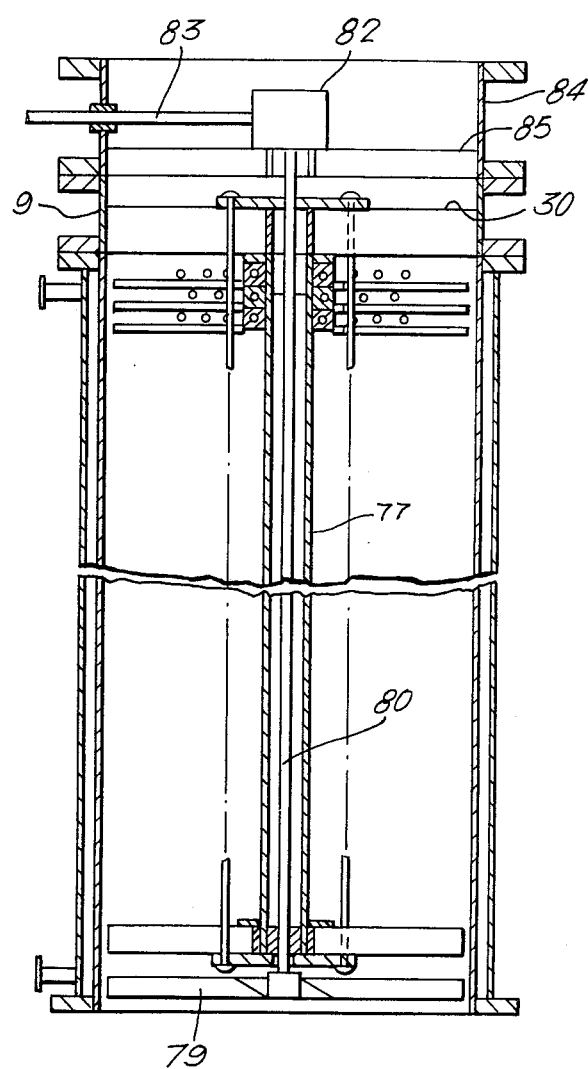
FIG. 11 is a view similar to FIG. 2 of part of a column according to a fifth embodiment.

In a fifth embodiment as shown in FIGS. 11 and 12, a polymerization column is constructed in a manner similar to that described in the first embodiment, but has each heat exchange tube in the form of a fluid ingoing tube length 15 connected to a fluid outgoing tube length 16 by an annular central box 76 which is basically similar in construction to the box 45 of the second embodiment. The boxes 76 are held in a stack formation not by a central rod passing through them as in the second embodiment but by the use of a support tube 77 which passes through the aligned boxes. The tube 77 is provided with end flanges which are welded thereto, the end flanges 78 being located outside of the engagement with the stacked boxes 76 so as to retain them in their assembled relationship.

This embodiment differs from the second embodiment because of the requirement to install an agitator 79 in the column. This agitator is disposed beneath the series of heat exchange tubes located within the upper casing half 7 of the upper section of the column. The agitator 79 is rotatably mounted within the column on the end of a rotatable shaft 80 which extends through the tube 77 and is supported therein by bearings 81. As shown in FIG. 11, the shaft is drivable through a drive gear disposed within a sealed casing 82 and a horizontal drive shaft 83 which extends through the side of a subsidiary casing 84 located on top of the support casing portion 9. An electric motor not shown is used for driving the drive shaft 83. The series of boxes 76 and their shaft 77 is retained in position within the column with the flanges 78 lying in engagement with the undersurface of the spider 30 and the upper surface of the stack support member 28. Abutment plates 35, screwed rods 33 and holding nuts 34 are used to hold the assembly of spider 30, boxes 76, tube 77 and stack support member 28 in their assembled form in a manner similar to that described in the first embodiment. In the construction of the fifth embodiment, however, it may be necessary to locate the screw fitted rods 33 on pitch circles of greater diameter than the first embodiment because of the larger diameter necessary for the boxes 76 to accommodate the shaft 77 and drive shaft for the agitator 79. The drive gear casing 82 is conveniently mounted upon a support spider 85 which is of similar construction to the support spider 30 and is welded or otherwise secured to the inner surface of the casing 84.

In a modification of the fifth embodiment, more than one agitator 79 may be used. Conveniently where additional agitators are used, they are located beneath series of heat exchange tubes in a manner similar to that described in the fifth embodiment. In this case, each additional agitator is driven in a manner similar to that described above by means of a drive shaft 80 and gearing located within a casing 82. In such cases, it is therefore necessary to locate subsidiary casings similar to casing 84 between casing halves 7 and 8 so as to locate the drive shaft and drive gear in position. In an alternative arrangement, however, where strength requirements of the shaft are adequate, it may be found convenient to dispose an additional agitator or agitators axially in line with the agitator 79 and driven from the same shaft 80 which extends downwardly through the column from the agitator 79.

In a further modification of the fifth embodiment to be used in cases where there is overcrowding of the heat exchange tubes, boxes and rods 33 in the center of the column, the rods 33 are replaced by some other means for holding the stack of boxes and heat exchange tubes in position. In this modification (not shown), a support means for the tubes and boxes comprises a plurality of axially extending arms which are disposed towards the outside of the chamber of the column i.e. radially outside the heat exchange tubes themselves, and these arms are secured at their ends to the main support 30 and to the stack support member 28.

What is claimed is:

1. A polymerization column for polymerizing a monomeric vinylidene compound comprising a casing defining within it a polymerization chamber, a heat exchange means contained within the chamber, the heat exchange means comprising a series of heat exchange tubes which are spaced apart vertically of the chamber and each tube having a tube inlet and a tube outlet, a fluid ingoing tube length extending across the chamber in one directional sense from the tube inlet and a fluid return tube length which extends across the chamber in the opposite directional sense from the ingoing tube length to the tube outlet, and both tube lengths being in the form of windings to provide laterally spaced portions of each tube length with portions of one tube length being disposed laterally between spaced portions of the other tube length when considered in a radial plane of the chamber, and means to control the temperature of each tube.

2. A column according to claim 1 wherein portions of one tube length lie between portions of the other tube length with median axes of the two tube lengths lying in a single radial plane.

3. A column according to claim 2 wherein the fluid ingoing tube length is in the form of a planar spiral which extends radially inwards of the chamber from the fluid inlet and the return tube length extends radially outwards from the ingoing tube length and is also in the form of a planar spiral with the convolutions of the spiral of the return tube length alternating with those of the ingoing tube length radially across the chamber.

4. A column according to claim 2 wherein the fluid ingoing tube length is in the form of a plurality of planar sinuations extending across the chamber and the return tube length is also in the form of planar sinuations, the sinuations of each length lying between those of the other length.

5. A column according to claim 2 provided with a plurality of tube spacing members comprising arms extending radially of the chamber, the spacing members alternating with the tubes and with the arms disposed between the tubes.

6. A column according to claim 5 wherein there is provided a carrier for the tubes and a support member, the tubes and spacing members being disposed in a stack upon the support member which is disposed beneath the carrier, and suspension means are provided which extend between the carrier and support member to suspend the support member from the carrier.

7. A column according to claim 2 wherein the tubes are provided with spacing means which comprise a stack of boxes extending axially along the column, the boxes being provided one for each tube with the boxes defining individual heat exchange chambers, and each box having the fluid ingoing tube length and fluid return tube length of its associated tube connected to it in intercommunication with the chamber for flow therethrough of fluid.

8. A column according to claim 7 wherein the boxes are each of annular form and define holes which are axially in alignment and a box support tube extends through the stack, the column also comprising an agitator which is rotatably carried beneath the stack of boxes on a drive shaft which extends through the aligned holes in the boxes and is rotatable therein.

9. A column according to claim 3 wherein inlet and outlet headers are provided for the tubes, the headers each being disposed within and extending downwardly of the chamber of the column in positions between the tubes and the casing, and each header, in a cross-section normal to its length, has a major axis and a minor axis, the minor axis lying substantially upon a radial line of the chamber effectively to minimize the distance between the casing and the outer spirals of the tubes.

10. A column according to claim 3 wherein the tubes are provided with at least two inlet headers and two outlet headers, the headers being spaced apart circumferentially of the casing and extending downwardly of the column, the tube inlets and tube outlets of adjacent tubes being angularly offset in relation to one another with respect to the axis of the column and being interconnected respectively with different inlet and outlet headers, and convolutions of the spirals of each tube are disposed in axial alignment with spaces between convolutions of the spirals of an adjacent tube.

11. A column according to claim 3 wherein the tubes are relatively disposed with the convolutions of the spirals of each tube located in axial alignment with spaces between convolutions of the spirals of an adjacent tube.

12. A method of polymerizing a monomeric vinylidene compound comprising feeding partially polymerized compound downwardly of a chamber of a polymerization column at a controlled rate of feed end, during the feeding, controlling the temperature of the compound at any given axial position and its temperature gradient as it descends the column by passing the compound over heat exchange tubes which lie in planes across the chamber, the tubes being disposed in series along the axis of the column and each tube having a fluid ingoing tube length and a fluid outgoing tube length, the lengths extending in directions of opposite sense across the chamber and both tube lengths being in the form of windings to provide laterally spaced portions of each tube length with spaced portions of one tube length being disposed between spaced portions of the other tube length, the temperature of the compound being controlled as it passes each tube by heat exchange between the compound and the two tube lengths, the temperature of each tube progressively changing along the tube lengths so that the temperature of each tube length portion is different from the tube length portions which it lies between to provide a temperature compensation effect and maintain a substantially constant temperature level radially across the compound at the tube level, and the temperature of the tubes being controlled within limits with respect to one another so as to control the temperature gradient and rate of polymerization of the compound as it passes down the chamber.

* * * * *

UNITED STATES PATENT AND TRADEMARK OFFICE
CERTIFICATE OF CORRECTION

PATENT NO. : 4,107,410
DATED : August 15, 1978
INVENTOR(S) : Barna TOEKES

It is certified that error appears in the above–identified patent and that said Letters Patent are hereby corrected as shown below:

Column 12, Claim 12, line 63, change "end," to -- and, --.

Signed and Sealed this

Sixth Day of March 1979

[SEAL]

Attest:

RUTH C. MASON
Attesting Officer

DONALD W. BANNER
Commissioner of Patents and Trademarks